United States Patent
Van Tol

(10) Patent No.: US 6,907,120 B1
(45) Date of Patent: Jun. 14, 2005

(54) SYSTEM FOR ESTABLISHING A PERMANENT INTERNET CONNECTION VIA A SWITCHING POP

(75) Inventor: Alphonsus Johannes Van Tol, Alphen a/d Rijn (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 09/700,814

(22) PCT Filed: Apr. 29, 1999

(86) PCT No.: PCT/NL99/00258

§ 371 (c)(1),
(2), (4) Date: Nov. 20, 2000

(87) PCT Pub. No.: WO99/63736

PCT Pub. Date: Dec. 9, 1999

(30) Foreign Application Priority Data

Jun. 2, 1998 (NL) .............................................. 1009297

(51) Int. Cl.⁷ ................................................ H04M 7/00
(52) U.S. Cl. ............................ 379/221.02; 379/221.01; 709/226; 709/227
(58) Field of Search ................................ 709/219, 227, 709/226, 203; 379/266, 221.02, 201.5, 219, 220.01, 221.05; 370/238; 705/10

(56) References Cited

U.S. PATENT DOCUMENTS

| | | | | | |
|---|---|---|---|---|---|
| 5,937,042 | A | * | 8/1999 | Sofman | 379/112.05 |
| 6,012,088 | A | * | 1/2000 | Li et al. | 709/219 |
| 6,151,629 | A | * | 11/2000 | Trewitt | 709/227 |
| 6,282,269 | B1 | * | 8/2001 | Bowater et al. | 379/88.17 |
| 6,341,160 | B2 | * | 1/2002 | Tverskoy et al. | 379/88.13 |
| 6,480,594 | B1 | * | 11/2002 | Van Tol | 379/221.02 |
| 6,628,775 | B1 | * | 9/2003 | Van Tol | 379/221.02 |

* cited by examiner

Primary Examiner—Paul H. Kang
(74) Attorney, Agent, or Firm—Michaelson & Associates; Peter L. Michaelson

(57) ABSTRACT

System for establishing a permanent connection between the Internet and a user subscribed to it. There, a switching PoP (4) is used in which in addition to the incoming lines (1) through which switched telephone traffic enters, there are lines (?) which are not connected to the telephone exchange (3) and are permanently connected to a connection at a subscriber. The inputs (7) of the PoP (4) not being connected to the telephone exchange (3) are executed as two-wire connections in such a way that the subscriber is directly connected to the PoP (4), One can also use standard multiplexing equipment (6), to which the subscriber is connected through a two-wire connection, said equipment being connected to said switching PoP (4) and is switched on the basis of an instruction from the PoP manager (8).

4 Claims, 1 Drawing Sheet

SYSTEM FOR ESTABLISHING A PERMANENT INTERNET CONNECTION VIA A SWITCHING POP

Figure 1:
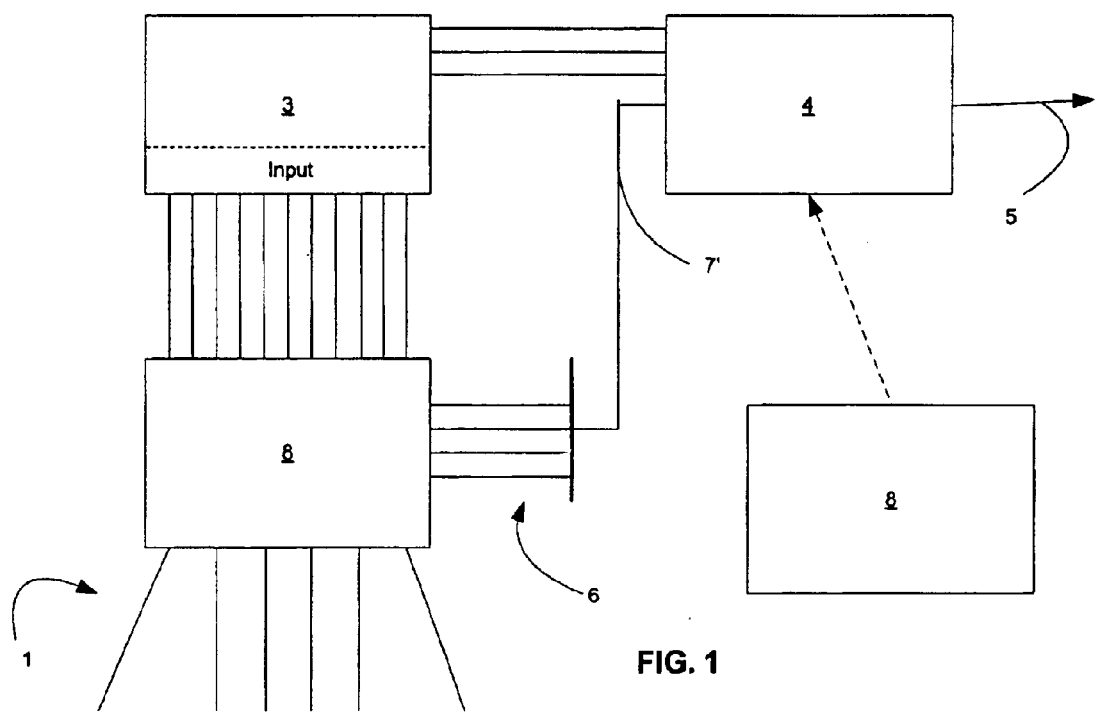

The invention relates to a system for establishing a permanent connection between the Internet and a user subscribed to it.

With the popularization of the Internet an increasing part of the public wishes to have a permanent Internet connection.

The xDSL techniques can offer this but as yet they are costly. Further, there are cable operators offering unlimited access through their networks. However, the public telephone network is not suitably arranged for providing a permanent connection.

The object of the invention is to remove this difficulty and to enable the present telecom operators to provide permanent access to the Internet at reasonable prices, According to the invention, to that end it is provided for that a switching PoP is used in which in addition to the incoming lines through which switched telephone traffic enters, there are lines which are not connected to the telephone exchange and are permanently connected to a connection at a subcriber.

Applying a switching PoP is described in the non-prepublished patent application NL 1009083. Such switching PoPs can be managed by an Internet Access Operator, or by the PSTN operator, in which PSTN stands for Public Switched Telephony Network or the public telephone network. The PoPs can be put on the level of the larger number exchanges. On the level above it, the traffic exchanges, these PoPs are maintained exclusively for the following situations:
  a) the number exchange is too small to render a PoP of its own profitable;
  b) the number exchange does not support the protocol for coupling of the PoP; and
  c) in case of a large demand per number exchange, switches to above-mentioned traffic exchange are made.

According to a development of the invention, the inputs of the PoP not being connected to the telephone exchange can be executed as two-wire connections in such a way that the subscriber is directly connected to the PoP.

It is also possible to use standard multiplexing equipment, to which the subscriber is connected by a two-wire connection, said multiplexing equipment being connected to said switching PoP and is switched on the basis of an instruction from the PoP manager.

Thus, at the same time the invention provides a switching PoP having such a functionality that the target ISP—Internet Service Provider—for some incoming lines is not determined by the number by which is called, but is set by the PoP manager at a distance.

A PoP manager is a PC directly adjacent the PoP or at distance from it, controlling a number of PoPs and performing the following functions:
  a) configuration management: management of the tables for conversion of telephone numbers into IP addresses;
  b) error management: indicating and recording errors in the connections to the PSTN and to the ISPs;
  c) performance management: monitoring the load of the PoPs for timely enhancement of the capacity; and
  d) accounting management: recording the use of the PoP itemized per ISP in order to be able to charge the costs in proportion.

Figure 2:
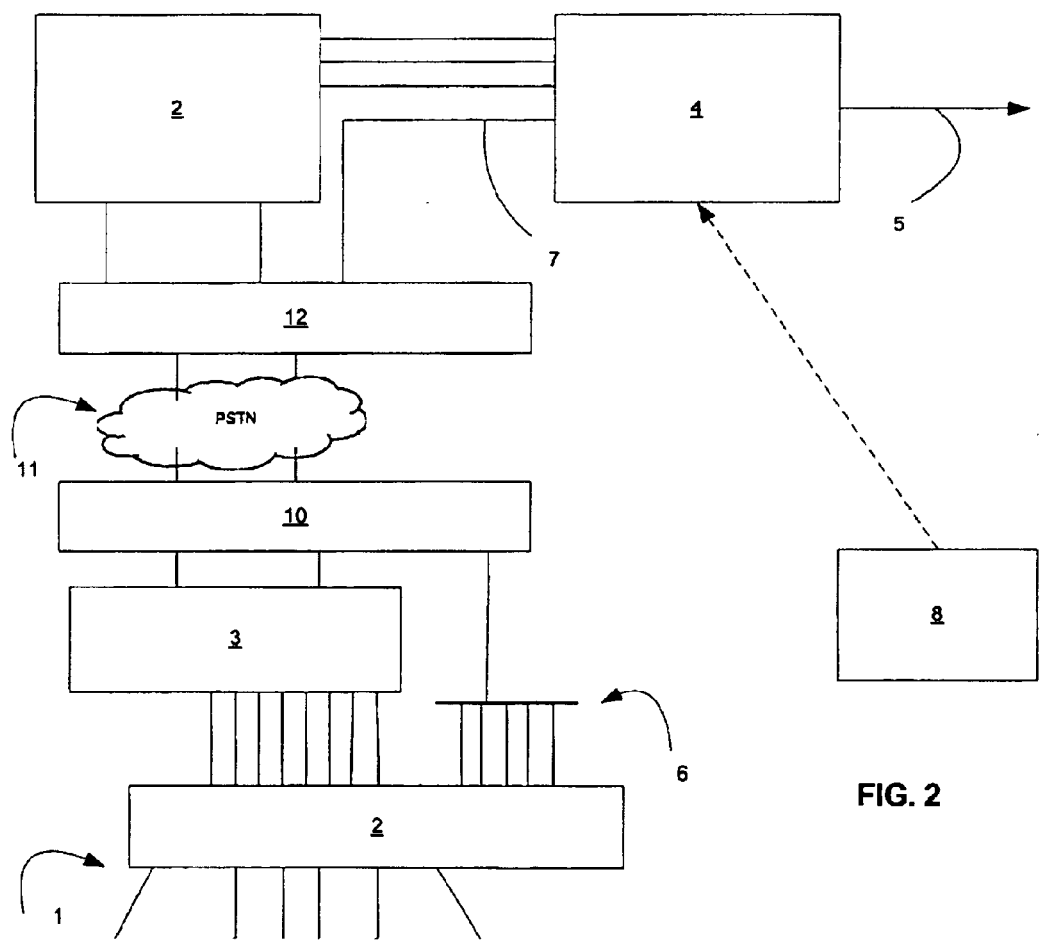

The invention is further explained by way of the drawing, in which the FIGS. 1 and 2 each show a diagram of an embodiment.

In FIG. 1, 1 indicates the lines from the central area, thus from the subscriber, entering at the main distributor 2. From said main distributor 2, the lines are connected to an input on the telephone exchange. Now when a subscriber makes an Internet call, the telephone exchange 3 connects him to the PoP 4, which leads the traffic through the PSPDN 5 to the proper ISP on the basis of the end numbers. PSPDN stands for Public Switched Packet Data Network.

The PoP 4 also has a number of inputs 7 that can be executed as two-wire connections in which the subscriber is directly connected to the PoP. Illustrated however, is the possibility in which standard multiplexing equipment 6 is employed. Since no calls come in over the lines concerned, it is not possible to switch them on the basis of the incoming telephone number. Therefore, these lines are switched on the basis of an instruction from the PoP manager 8.

A subscriber can obtain a permanent Internet connection by connecting a core pair 1 from his home connection to an input of the multiplexing equipment 6 through the main distributor 2. For the PSTN operator this means permanent provision of a core pair in the connecting network. Generally, there is a shortage in the connecting network, yet the capacity required for this permanent Internet connection is available in modern networks.

In those cases where there is no PoP at the exchange to which the subscriber is connected, the permanent Internet connection is established by a fixed connection between number exchange and the next traffic exchange.

FIG. 2 shows a diagram which is more extensive than that of FIG. 1, but wherein corresponding parts have been indicated with the same reference numbers.

The lines 1 from the subscribers again are connected to the multiplexing equipment 6 through the main distributor 2, the output of which now extending to the 2 Mb distributor 10. Through the transmission net 11, the signal arrives on the 2 Mb distributor at the traffic exchanges 12. From there, connection to the input 7 of the PoP 4 takes place.

In this case, the costs for the PSTN operator are a core pair in the connecting network and a 64 kb channel in the connection between number exchange and traffic exchange.

With this arrangement having one PoP per large number exchange and a PoP on each traffic exchange, it is preferable to employ a PoP manager in each area. The sizes of said areas and the place where the PoP managers will be arranged will depend on the organization of the Internet Access operator.

It will be obvious, that only some possible embodiments of a system according to the invention have been illustrated in the drawing and described above and that many changes can be made without leaving the inventive idea, as it is indicated in the accompanying claims.

What is claimed is:

1. System for establishing a permanent connection between the Internet and a user subscribed to the Internet, said system comprising a switching PoP (4) having incoming lines (1) through which switched telephone traffic enters, characterized in that said system further comprises a PoP manager (8), and inputs (7) which are not connected to the telephone exchange (3) and which are permanently connected to a connection at a subscriber, said subscriber being connected through said connection, inputs (7) and switching PoP (4) to an ISP on the basis of an instruction from the PoP manager (8).

2. System according to claim 1, characterized in that the inputs (7) of the PoP (4) not being connected to the telephone exchange (3) can be executed as two-wire connections in such a way that the subscriber is directly connected to the switching PoP (4) and is switched on the basis of an instruction of the PoP manager (8).

3. System according to claim 1, characterized in that standard multiplexing equipment (6) is employed, to which the subscriber is connected by a two-wire connection, said multiplexing equipment being connected to said switching PoP (4) and is switched on the basis of an instruction of the PoP manager (8).

4. Switching PoP for use with the system according to claim 1, characterized in that the PoP (4) is switchable by a PoP manager (8) at a distance.

* * * * *